(12) United States Patent
Morand

(10) Patent No.: US 12,069,137 B2
(45) Date of Patent: Aug. 20, 2024

(54) METHOD AND DEVICE FOR MEDIATING A SET OF APPLICATIONS

(71) Applicant: ORANGE, Issy-les-Moulineaux (FR)

(72) Inventor: Lionel Morand, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/249,847

(22) PCT Filed: Oct. 14, 2021

(86) PCT No.: PCT/FR2021/051790
§ 371 (c)(1),
(2) Date: Apr. 20, 2023

(87) PCT Pub. No.: WO2022/084606
PCT Pub. Date: Apr. 28, 2022

(65) Prior Publication Data
US 2023/0421640 A1 Dec. 28, 2023

(30) Foreign Application Priority Data

Oct. 23, 2020 (FR) ..................................... 2010885

(51) Int. Cl.
*H04L 67/141* (2022.01)
*H04L 41/0686* (2022.01)
*H04L 69/22* (2022.01)

(52) U.S. Cl.
CPC ........ *H04L 67/141* (2013.01); *H04L 41/0686* (2013.01); *H04L 69/22* (2013.01)

(58) Field of Classification Search
CPC ..... H04W 80/06; H04W 24/10; H04W 4/029; H04L 67/1097; H04L 45/00; H04L 69/22; H04L 61/2514; H04L 65/80; H04L 69/16; G06F 16/00; H04Q 3/0025; H04Q 3/0045
See application file for complete search history.

(56) References Cited

U.S. PATENT DOCUMENTS

2021/0136844 A1* 5/2021 Zee ................... H04W 28/0861

OTHER PUBLICATIONS

Stewart, "Stream Control Transmission Protocol" Network Working Group, Request for Comments 4960, Sep. 2007.

(Continued)

*Primary Examiner* — Chirag R Patel
(74) *Attorney, Agent, or Firm* — David D. Brush; Westman, Champlin & Koehler, P.A.

(57) ABSTRACT

A method for mediating a plurality of user applications via an application relating to a Stream Control Transport Protocol, called a generic application. The method is implemented in an agent device, capable of establishing a connection based on the Stream Control Transport Protocol with a terminal device. The method includes: receiving from the terminal device a request packet of the Stream Control Transport Protocol comprising a data fragment containing an identifier of a user application requested by the terminal device and further comprising a header containing a destination port identifier dedicated to the generic application; verifying that the requested user application is an application of the plurality; and in the case where the requested user application is an application of the plurality, transmitting to the terminal device an agreement message.

12 Claims, 9 Drawing Sheets

(56) References Cited

OTHER PUBLICATIONS

English translation of the Written Opinion of the International Searching Authority dated Feb. 11, 2022 for corresponding International Application No. PCT/FR2021/051790, filed Oct. 14, 2021.
Lottor Sri-Nic M, "TCP Port Service Multiplexer (TCPMUX); rfc1078.txt", TCP Port Service Multiplexer (TCPMUX) ?; RFC1078. TXT, Internet Engineering Task Force, IETF; Standard, Internet Society (ISOC) 4, Rue Des Falaises CH—1205 Geneva, Switzerland, Nov. 1, 1988 (Nov. 1, 1988), XP015006020.
Ian Rytina Ericsson LTD UK, "Comments on Draft Recommendation Q.2150.3 Signalling Transport Converter on SCTP", ITU-T Draft ; Study Period 2001-2004, International Telecommunication Union, Geneva ; CH, vol. 13/11, Nov. 2, 2002 (Nov. 2, 2002), p. 1-3, XP017496196.
Jesup Mozilla S Loreto Ericsson M Tuexen Muenster Univ of Appl Sciences R, "WebRTC Data Channel Establishment Protocol; draft-ietf-rtcweb-data-protocol-09.txt", WEBRTC Data Channel Establishment Protocol; DRAFT-IETF-RTCWEB-DATA-PROTOCOL-09.TXT, Internet Engineering Task Force, IETF;. Standardworkingdraft, Internet Society (ISOC) 4, Rue Des Falaises CH—1205 Geneva, Switzerland, Jan. 4, 2015 (Jan. 4, 2015), p. 1-13, XP015103811.
International Search Report dated Feb. 11, 2022 for corresponding International Application No. PCT/FR2021/051790, filed Oct. 14, 2021.
Written Opinion of the International Searching Authority dated Feb. 11, 2022 for corresponding International Application No. PCT/FR2021/051790, filed Oct. 14, 2021.

* cited by examiner

[Fig 1]
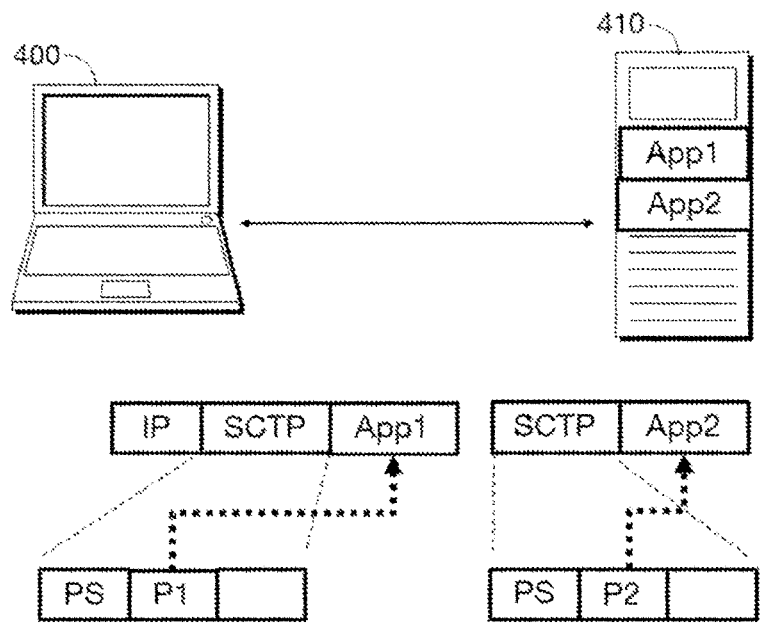

[Fig 2]
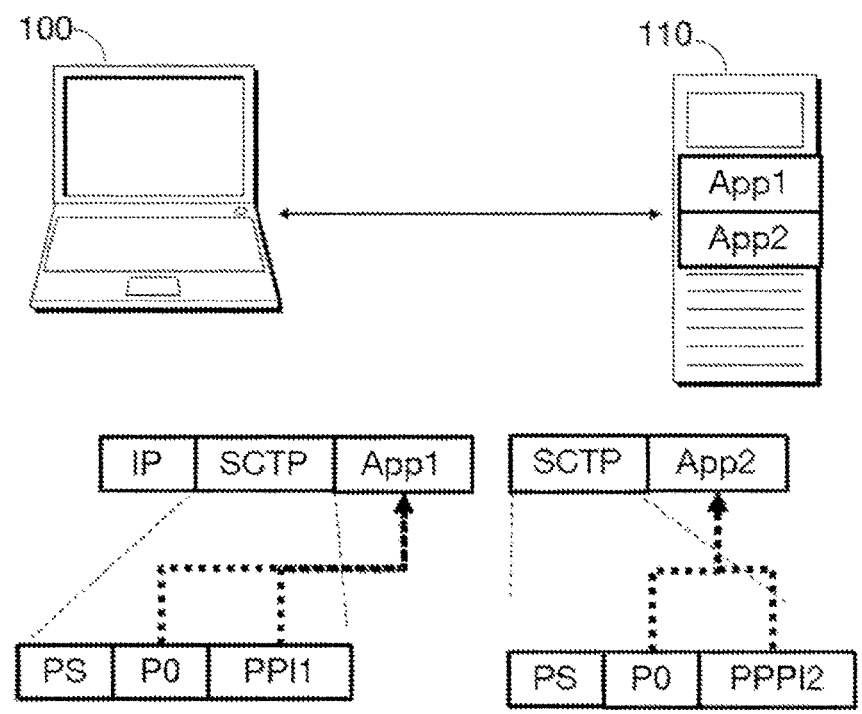

[Fig 3]
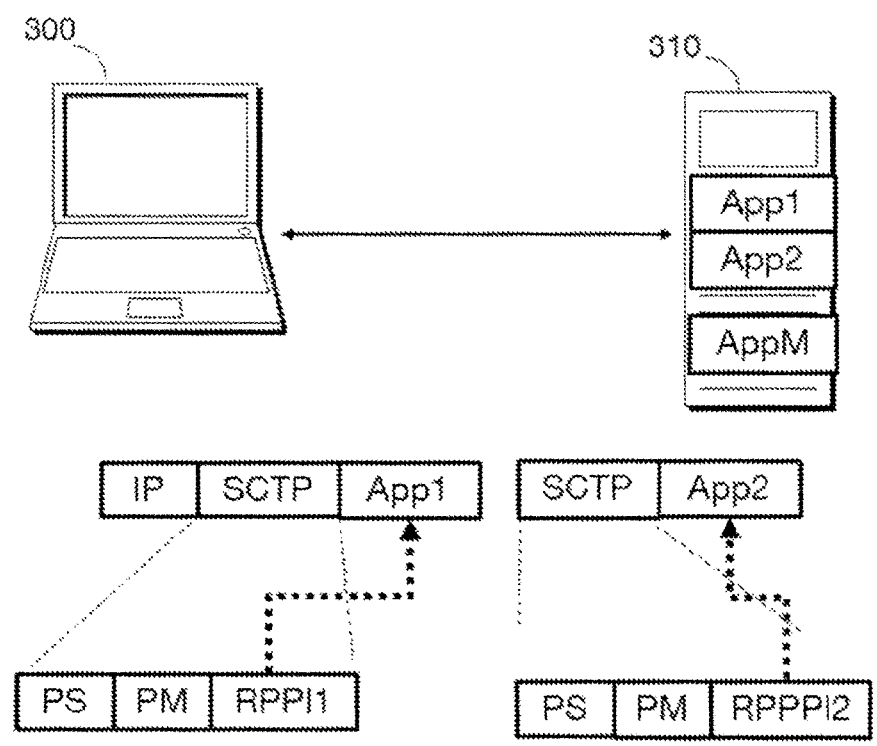

[Fig 4]
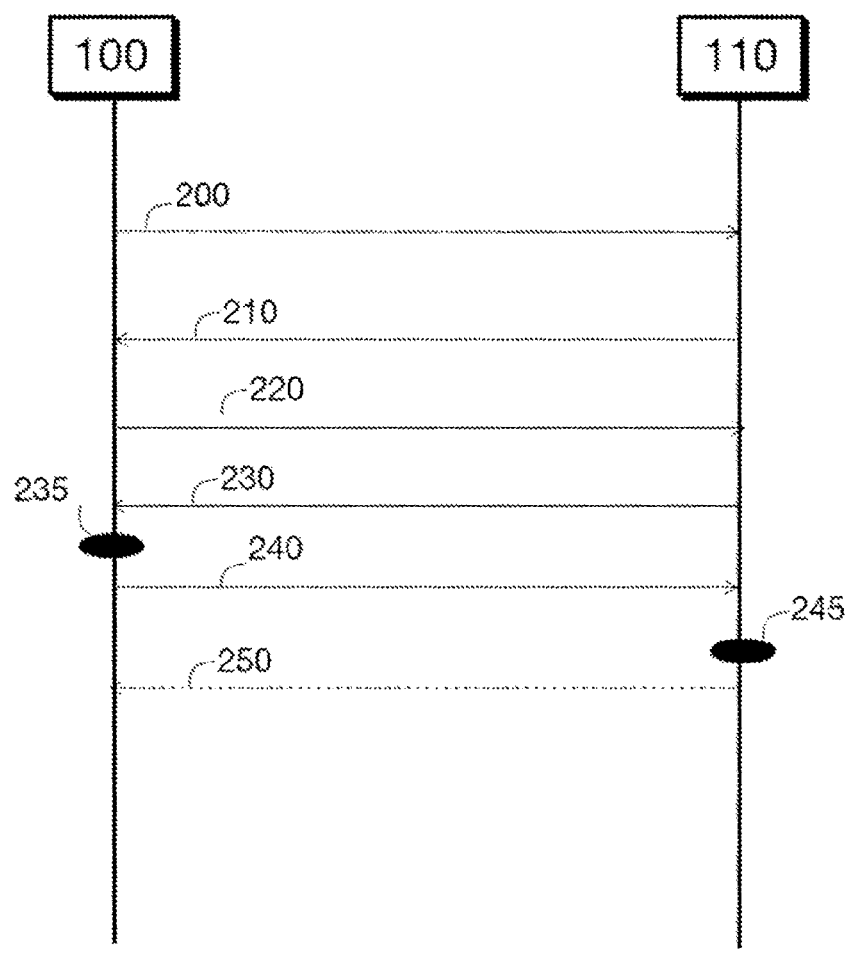

[Fig 5]
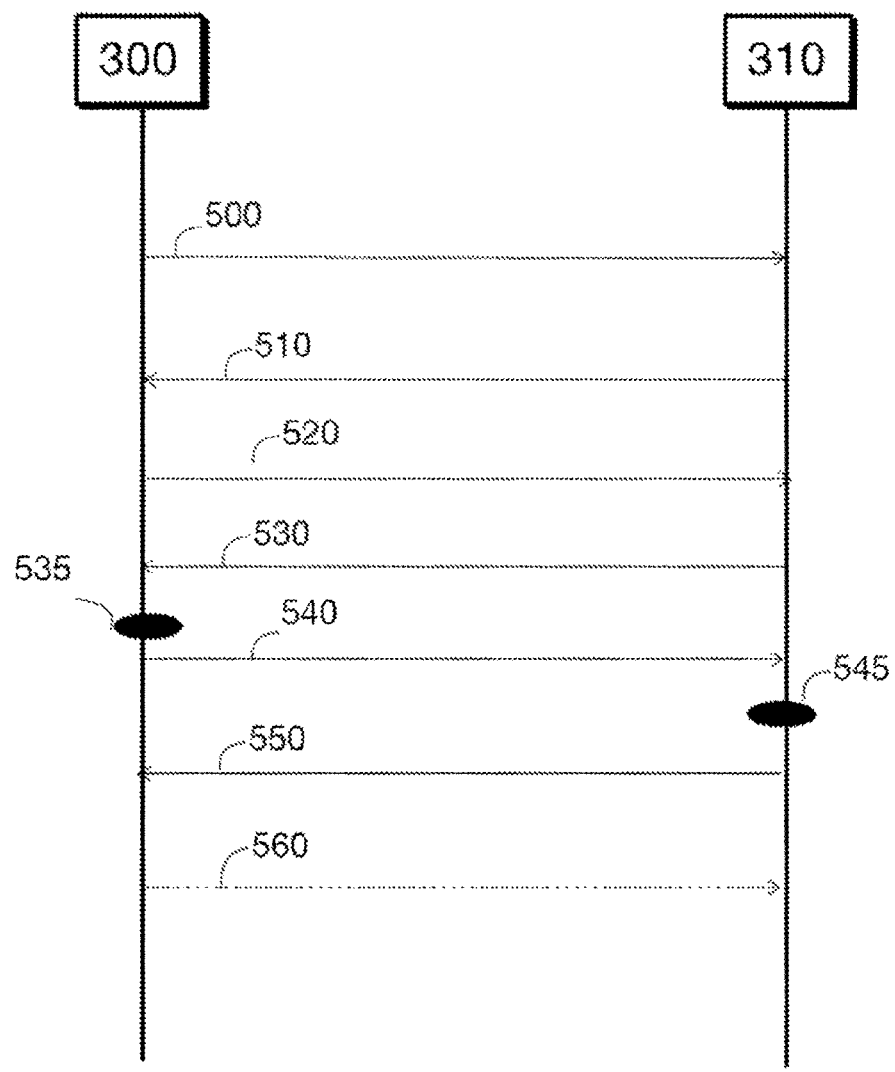

[Fig 6]
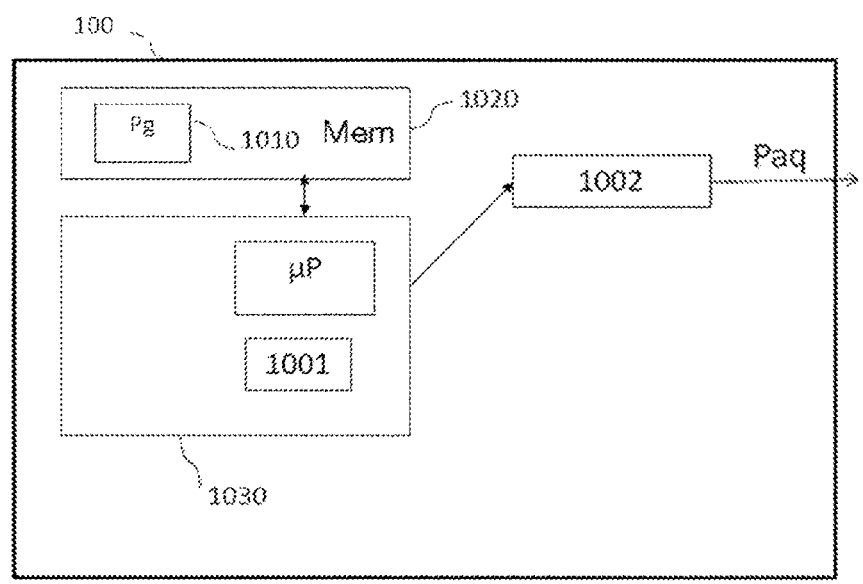

[Fig 7]
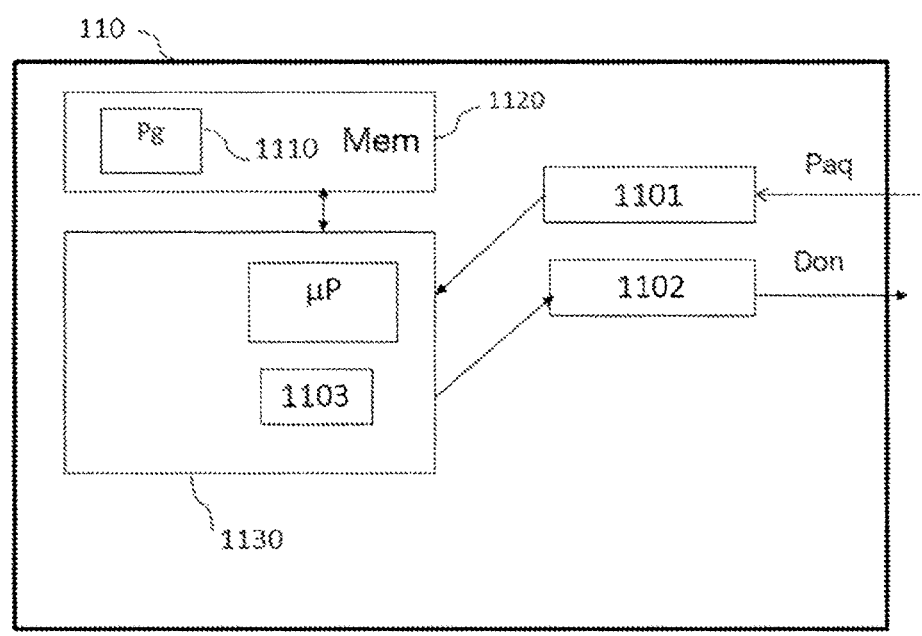

[Fig 8]
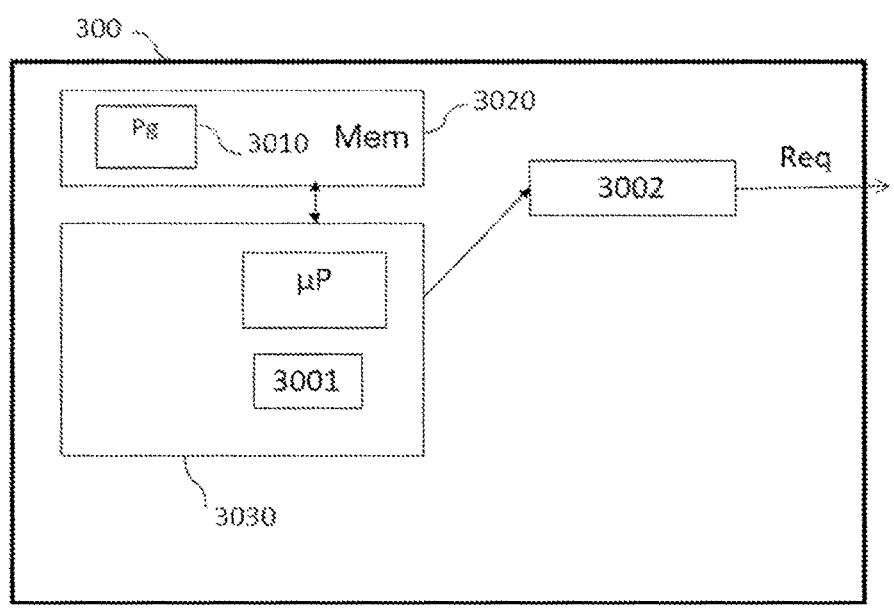

[Fig 9]
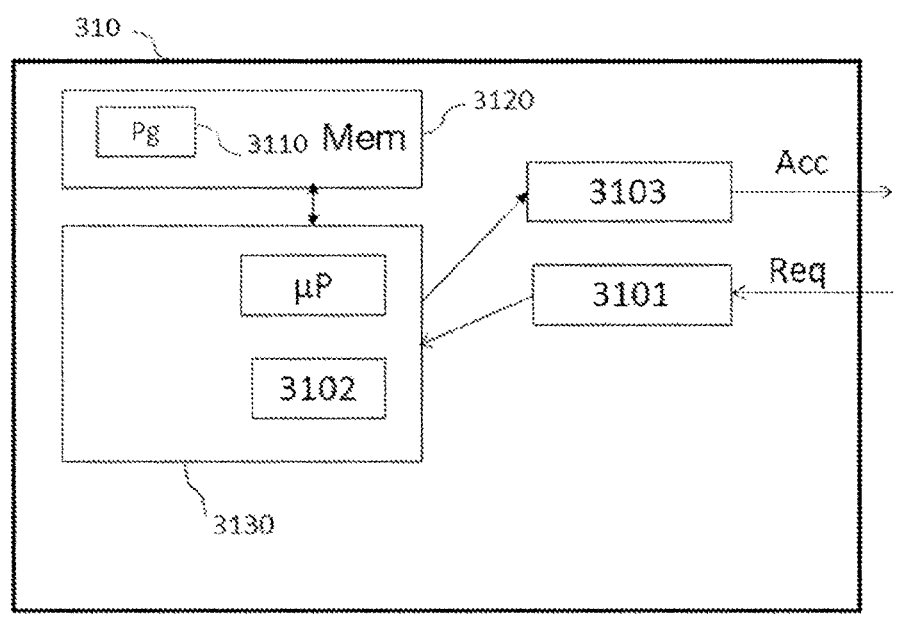

METHOD AND DEVICE FOR MEDIATING A SET OF APPLICATIONS

1. CROSS-REFERENCE TO RELATED APPLICATIONS

This application is a Section 371 National Stage Application of International Application No. PCT/FR2021/051790, filed Oct. 14, 2021, which is incorporated by reference in its entirety and published as WO 2022/084606 A1 on Apr. 28, 2022, not in English.

2. TECHNICAL FIELD

The invention relates to communication networks, and more specifically to networks in which the data streams are routed by using a stream transport protocol, such as the SCTP protocol (Stream Control Transport Protocol), these data streams relating to multiple applications. The invention more particularly targets the ability to unambiguously differentiate data relating to multiple applications transported simultaneously over the same transport protocol.

3. PRIOR ART

Network architectures that are specified and deployed these days are based on a layered communication system in which each layer is responsible for a routing service. Thus, the Internet architectures commonly used for a wide range of needs and services are based on the TCP/IP (transmission control protocol/Internet protocol) protocols comprising a set of protocols. Among these layers, there are the IP layer that notably makes it possible to reach a correspondent using an IP address and the transport layer that notably ensures the correct routing of data between two correspondents, as well as the integrity of these data. Transport protocols that can be identified notably include the UDP (user data protocol), and TCP protocols, as well as the SCTP protocol specified in the IETF document RFC 4960 (September 2007). The SCTP protocol notably offers features of reliability, of redundancy, of security and of reliability, which are particularly relevant for constrained services, such as telephony over IP services. It should also be noted that the transport protocols used in the networks route data streams of various applications. Thus, the application data routed via the transport protocols, including the SCTP protocol, are multiplexed by using a common IP address and by using a port number relating to the transport protocol associated with a specific application. Thus, as indicated in [FIG. 1], a node 400 transmitting application data of the applications App1, App2 to a node 410, transmits IP packets comprising the IP address (source) of the node 400, the IP address (destination) of the node 410, the port PS (source) of the transport protocol, the port (destination) of the transport SCTP protocol. In the current architectures, the destination port used unambiguously identifies the application data transported over the transport protocol. Thus, the data of the application App1 will be identified by a destination port P1, the data of the application App2 by a destination port P2. Thus, the transport layer routes data streams of multiple applications App1, App2 by differentiating these streams with specific port numbers P1 and P2.

The node 410 is thus capable of transmitting the data received from the node 400 and relating to the applications App1, App2 to the entities responsible for the applications App1, App2 by analyzing the destination port used in the transport SCTP protocol. For each application deployed in the networks, according to the current techniques, notably when the application is used on the public Internet, it is necessary to allocate a port of the transport protocol. It is thus necessary to invoke the IANA (https://www.iana.org/assignments/service-names-port-numbers/service-names-port-numbers.xhtml) which allocates these ports. However, the allocation procedures are becoming increasingly stricter, because IANA fears seeing all the port numbers assigned and being in a position in which it lacks port numbers. It is thus becoming very difficult to obtain these port numbers. Furthermore, in the case of the deployment of a so-called private network, that is to say one managed by an entity and not needing to communicate with so-called public networks over the Internet, the IANA has greatly restricted the possibility of making use of the allocation of public port numbers, which poses problems of number conflicts and of management of these port numbers, notably in the case of interconnection with other so-called private networks. This unavailability of the port numbers of the transport layer, and notably for the SCTP protocol, therefore poses service and application deployment problems. It should be noted that the TCPMux protocol defined in the IETF document RFC 1078 describes an application stream multiplexing method but this method is specific to the TCP protocol (November 1998) and its implementation notably poses problems of security, which renders it inoperative for the requirements described above.

The object of the present invention is to provide improvements over the state of the art.

4. SUMMARY OF THE INVENTION

The invention aims to improve the situation using a method for switching a datum relating to an application transported in a data fragment of a packet of a stream transport protocol, such as the Stream Control Transport Protocol, implemented by a multiplexing device capable of transferring data relating to a plurality of applications to processing entities, and comprising the reception, from a terminal device, of the packet of the stream transport protocol comprising a header containing a first destination port identifier common to the plurality of applications, and the data fragment comprising a second identifier specific to the application, the determination of the application as a function of the first and second identifiers received and in the case where the application is determined, the transmission of the datum to an entity responsible for the processing of the datum of the application. A multiplexing device receiving several packets of the transport protocol, such as SCTP, can thus transfer the application data to the different entities responsible for the reception, the processing, and possibly the construction of a response as a function of the two identifiers present in the header and each of the fragments transporting the application data. For example, if two voice-over-IP and video-over-IP applications are activated, the switching device, present for example in a voice-over-IP client, will receive the voice-over-IP and video-over-IP streams and transmit the voice-over-IP data to the process managing the voice-over-IP sessions and the video-over-IP data to the process managing the video-over-IP application, possibly deployed on a terminal other than the voice-over-IP client. This method thus makes it possible to save on the destination ports used to multiplex the application streams in a connection to the transport level while ensuring the multiplexing method necessary to transmit distinct application streams over a same connection between two pieces of equipment. The multiplexing device comprises means for being able to analyze the identifiers received and, on the other hand, determine if the two identifiers correspond to an application for which the multiplexing device is capable of managing the data.

The switching method thus makes it possible to unambiguously differentiate data relating to several applications transported simultaneously over the same transport protocol.

According to one aspect of the invention, the switching method further comprises the transmission of an error message to the terminal device in the case where an application is not determined.

The terminal device can advantageously be informed of an identifier selection or identifier parameterizing problem, and/or of a problem of compatibility of the switching device to be able if necessary to change switching device, initialize a new SCTP connection and/or verify one or other of the identifiers transmitted.

According to another aspect of the invention, in the switching method, the error message is a packet of the stream transport protocol comprising a fragment containing an error code of Abort type.

The use of an Abort message, that is to say the sending of a fragment comprising an Abort information item, makes it possible to be able to terminate the SCTP association between the terminal device and the switching device and make use of a message defined in the specification of the SCTP protocol.

According to another aspect of the invention, in the switching method, the error message comprises a failure cause intended for the application implemented in the terminal device.

As indicated above, various causes can result in the reception of an error message from the switching device. It is therefore advantageous to provide failure causes corresponding to the problems that the switching device can encounter and thus allow the terminal device to be able to make use of an appropriate solution with respect to the failure cause received.

According to another aspect of the invention, in the switching method, the first destination port identifier is a port identifier dedicated to the switching method.

The destination port identifier can be a port dedicated to the switching method thus allowing the switching device to make use, directly and without further examination of the packets, of a switching process. Also, a port dedicated to the switching method avoids the problem of identifier conflicts if a same identifier is used for two distinct methods or two distinct applications. Such a dedicated port can thus be implemented in a public network (Internet) or a private network (mobile network based on the 3GPP specifications).

According to another aspect of the invention, in the switching method, the first destination port identifier is a port identifier already allocated for the TCPMux protocol.

The TCPMux protocol already uses a specific port for the multiplexing of application streams over a TCP connection according to a method distinct from the switching method. However, notably in the case where the TCPMux protocol and the switching method are used by a same entity, the use of a same port identifier for the two methods offers the advantage of simplifying the management of the multiplexing services based on one or other of the protocols and method.

According to another aspect of the invention, in the switching method, the first destination port identifier is a port identifier allocated for an application based on the SCTP protocol.

The first destination port identifier can be an identifier of an SCTP application, therefore an identifier already used for another need, making it possible to not make use of a specific identifier and thus preserving the identifiers to be used for the applications and methods relying on SCTP.

The various aspects of the switching method which have just been described can be implemented independently of one another or in combination with one another.

The invention relates also to a method for configuring a packet of a stream transport protocol such as the Stream Control Transport Protocol, the packet comprising a header and a data fragment, the method being implemented by a terminal device capable of transmitting a datum relating to an application to a multiplexing device, and comprising the parameterizing of the packet with a first destination port identifier in the header and with a second identifier specific to the application in the data fragment, as well as the transmission, to the multiplexing device, of the parameterized packet.

According to another aspect of the invention, the configuration method further comprises the reception of an error message if no application is determined by the multiplexing device from the parameterized first identifier and second identifier.

The various aspects of the configuration method which have just been described can be implemented independently of one another or in combination with one another.

The invention relates also to a switching device capable of transferring data relating to a plurality of applications to processing entities, one of the data being transported in a data fragment of packet of a stream transport protocol, such as the Stream Control Transport Protocol, comprising:
  a receiver, capable of receiving, from a terminal device, the packet of the stream transport protocol comprising a header containing a first destination port identifier common to the plurality of applications, and the data fragment comprising a second identifier specific to the application,
  a determination module, capable of determining the application as a function of the first and second identifiers received,
  a transmitter, capable of transmitting the datum to an entity responsible for the processing of the datum of the application in the case where the application is determined.

This device, capable in all its embodiments of implementing the switching method which has just been described, is intended to be implemented in an application server, in a router of a communication network or of an intermediary equipment (DPI (deep packet inspection) or firewall) or even in a piece of equipment of a mobile network (access gateway, server of an MEC (mobile edge computing) architecture). The device 100 can also be implemented in a user equipment.

The invention relates also to a device for configuring a packet of a stream transport protocol such as the Stream Control Transport Protocol, the packet comprising a header and a data fragment, comprising:
  a parameterizing module, capable of parameterizing the packet with a first destination port identifier in the header and with a second identifier specific to an application in the data fragment,
  a transmitter, capable of transmitting, to a multiplexing device, the parameterized packet.

This device, capable in all its embodiments of implementing the configuration method which has just been described, is intended to be implemented in a user equipment or else in a gateway of a personal network. It can also be implemented in an application server, in a router of a communication network or an intermediate equipment (DPI (deep packet inspection) or firewall) or even in a piece of equipment of a mobile network (access gateway, server of an MEC (mobile edge computing) architecture).

The invention relates also to a system for switching a datum relating to an application transported in a fragment of a packet of a stream transport protocol, such as the Stream Control Transport Protocol, comprising:

a multiplexing device comprising a switching device,
a terminal device comprising a configuration device.

The invention relates also to computer programs comprising instructions for implementing the steps of the respective switching and configuration methods which have just been described, when one or other of these programs are run by a processor, and a storage medium that can be read respectively by a switching and configuration device on which the computer programs are stored.

The invention also improves the situation using a method for mediating a plurality of user applications via an application relating to the stream control transport protocol, such as the Stream Control Transport Protocol, called a generic application, the method being implemented in an agent device, capable of establishing a connection based on the stream transport protocol with a terminal device, and comprising the reception, from the terminal device, of a request packet of the stream control transport protocol comprising a data fragment containing an identifier of a user application requested by the terminal device, the verification that the requested user application is an application of the plurality, and, in the case where the requested user application is an application of the plurality, the transmission, to the terminal device, of an agreement message.

The association of an SCTP connection between the terminal device and the agent device is established by an exchange of INIT, INIT ACK, COOKIE-ECHO and COOKIE-ACK messages. Once the association is established, the devices can exchange user application data. The method allows the exchange of various user application data (voice-over-IP, video-over-IP, monitoring, etc.) by making use of a mediation, or generic, application, implemented in a mediation device. Thus, the destination port of the header of the SCTP protocol is specific to this mediation application, making it possible to save on the ports which would be used to distinguish the data of the user applications, this destination port dedicated to the generic application is further used in the SCTP messages exchanged in the setting up of the association. Once the association is established, the terminal device transmits a new and inventive SCTP request message, making it possible to interrogate the agent device on its capacity to ensure the mediation for the user applications for which it transmits the identifiers. Only in the case where the agent device is effectively able to ensure the mediation for a user application, the terminal device can transmit data of the user application that the agent device will be able to transmit to an application server, to a client of the data of the user application or to a process managing the user application deployed on the agent server. The method therefore allows the terminal device to transmit user data with a guarantee of the processing thereof by the agent device, and the agent device to dynamically inform the terminal devices of its user data processing capabilities while also preserving the destination ports used for the transport of the user application data.

According to one aspect of the invention, in the mediation method, the request packet further comprises a header containing a destination port identifier dedicated to the generic application.

The identification of the request packet received is facilitated by the use of the destination port present in the SCTP packets transmitted by the terminal device. Also, in the case where a large number of user applications are managed by the agent device, it may be advantageous to deploy several generic applications, and to distribute the mediation of the user applications over these different generic applications. Notably in this case, the use of the destination port present in the header of the SCTP packet received is particularly advantageous.

According to one aspect of the invention, in the mediation method, the agreement message comprises at least one identifier of a user application of the plurality accessible from the generic application.

The agent device relies effectively on the request message received to inform the terminal device of its capabilities in terms of user applications for which it ensures the mediation. The request message received can be used to transmit the list of the identifiers of the user applications, independently of the identifiers received in the request message received, thus corresponding to a Push message implemented by the agent device to inform the terminal device.

According to one aspect of the invention, the mediation method further comprises the reception, from the terminal device, of an application packet of the stream transport protocol comprising a data fragment containing the identifier specific to the requested user application and an application datum specific to the requested user application, and the transmission, to the requested user application, of the application datum received. The terminal device, for example a user equipment, uses the agreement message received and the information present in this message to transmit the application data by using application protocols above SCTP to the agent device and more specifically the generic application. The advantage of the method is notably, for the terminal device, that it obtains application identifiers preventively (in push mode) allowing it to transmit data relating to these applications without necessitating the sending of a new SCTP request message.

According to one aspect of the invention, the mediation method comprises the transmission, to the terminal device, of a failure message in the case where the identifier of the requested user application does not correspond to a user application of the plurality.

The terminal device can advantageously be informed of an identifier selection or identifier parameterizing problem, and/or of a problem of compatibility of the agent device, of availability of the generic application to receive user application data streams, to be able if necessary to change the agent device, initialize a new SCTP connection and/or verify one or other of the identifiers transmitted, memorize the data of the user applications to be transmitted.

According to one aspect of the invention, in the mediation method, the failure message is a packet of the stream transport protocol, comprising a fragment of Abort type terminating an association established between the terminal device and the agent device.

The use of an Abort message, that is to say the sending of a fragment comprising an Abort information item, makes it possible to be able to terminate the SCTP association between the terminal device and the agent device and make use of a message defined in the specification of the SCTP protocol.

According to one aspect of the invention, in the mediation method, the failure message further comprises a failure cause intended for the entity of the terminal device requesting the application.

Various problems can result in the reception of an error message from the agent device. It is therefore advantageous to provide failure causes that correspond to the problems that the agent device and/or the generic application can encounter and thus allow the terminal device to be able to make use of a suitable solution (invocation of another generic application, configuration of a new request packet, association with another agent device) with respect to the failure cause received.

The different aspects of the mediation method which have just been described can be implemented independently of one another or in combination with one another.

The invention relates also to a method for parameterizing a request packet of a stream control transport protocol, such as the Stream Control Transport Protocol, transmitted to an agent device, the method being implemented by a terminal device capable of communicating with the agent device, and comprising the determination of a request packet of the stream control transport protocol, comprising a data fragment comprising an identification datum of a user application requested by the terminal device, and the transmission to the agent device of the determined request packet.

According to one aspect of the invention, the parameterizing method further comprises the transmission to the agent device of an application packet of the stream transport protocol comprising a data fragment containing an identifier specific to the requested application and an application datum specific to the requested application.

According to one aspect of the invention, in the parameterizing method, the determined request packet further comprises a header containing a destination port identifier dedicated to an application relating to the stream control transport protocol, called a generic application.

The various aspects of the parameterizing method which have just been described can be implemented independently of one another or in combination with one another.

The invention relates also to a device for mediating a plurality of user applications via an application relating to a stream control transport protocol, such as the Stream Control Transport Protocol, called a generic application, capable of establishing a connection based on the stream transport protocol with a terminal device, and comprising
    a receiver, capable of receiving, from the terminal device, a request packet of the stream control transport protocol comprising a data fragment containing an identifier of a user application requested by the terminal device,
    a verification module capable of verifying that the requested user application is an application of the plurality,
    a transmitter, capable of transmitting, to the terminal device, an agreement message in the case where the requested user application is an application of the plurality.

This device, capable in all its embodiments of implementing the mediation method which has just been described, is intended to be implemented in an application server, in a router of a communication network or of an intermediary equipment (DPI (deep packet inspection) or firewall) or even in a piece of equipment of a mobile network (access gateway, server of an MEC (mobile edge computing) architecture). The device 100 can also be implemented in a user equipment.

The invention relates also to a device for parameterizing a request packet of a stream control transport protocol, such as the Stream Control Transport Protocol, transmitted to an agent device, implemented in a terminal device and comprising:
    a determination module, capable of determining a request packet of the stream control transport protocol, comprising a data fragment comprising an identification datum of a user application requested by the terminal device,
    a transmitter, capable of transmitting, to the agent device, the determined request packet.

This device, capable in all its embodiments of implementing the parameterizing method which has just been described, is intended to be implemented in a user equipment or else a gateway of a personal network. It can also be implemented in an application server, in a router of a communication network or an intermediate equipment (DPI (deep packet inspection) or firewall) or even in a piece of equipment of a mobile network (access gateway, server of an MEC (mobile edge computing) architecture).

The invention relates also to a system for mediating a plurality of user applications via an application relating to a stream control transport protocol, such as the Stream Control Transport Protocol, called a generic application, comprising:
    an agent device comprising a mediation device,
    a terminal device comprising a parameterizing device.

The invention relates also to computer programs comprising instructions for implementing the steps of the respective mediation and parameterizing methods which have just been described, when one or other of these programs are run by a processor and a storage medium that can be read respectively by a mediation and parameterizing device on which the computer programs are stored.

The programs mentioned above can use any programming language, and be in the form of source code, object code, or an intermediate code between source code and object code, such as in a partially compiled form, or in any other desirable form.

The information media mentioned above can be any entity or device capable of storing the program. For example, a medium can comprise a storage means, such as a ROM, for example a CD ROM or microelectronic circuit ROM, or even a magnetic storage means.

Such a storage means can for example be a hard disk, a flash memory, etc.

Also, an information medium can be a transmissible medium such as an electrical or optical signal, which can be routed via an electrical or optical cable, wirelessly or by other means. A program according to the invention can in particular be downloaded over a network of Internet type.

Alternatively, an information medium can be an integrated circuit in which a program is incorporated, the circuit being adapted to execute or be used in the execution of the methods concerned.

5. BRIEF DESCRIPTION OF THE DRAWINGS

Other features and advantages of the invention will become more clearly apparent on reading the following description of particular embodiments, given as simple illustrative and nonlimiting examples, and the attached drawings, in which:

FIG. 1 presents a simplified view of a communication between two nodes according to the prior art, FIG. 2 presents a simplified view of a communication between two nodes according to one aspect of the invention, FIG. 3 presents a simplified view of a communication between two nodes according to another aspect of the invention, FIG. 4 presents an outline of the method for switching a datum relating to an application and of the configuration method according to an embodiment of the invention, FIG. 5 presents an outline of the method for mediating a plurality of applications via a generic application and the parameterizing method according to an embodiment of the invention, FIG. 6 presents a device for switching a datum relating to an application according to an embodiment of the invention, FIG. 7 presents a device for configuring a packet of a stream transport protocol according to an embodiment of the invention, FIG. 8 presents a device for mediating a plurality of applications via a generic application according to an embodiment of the invention, FIG. 9 presents a device for parameterizing a stream control transport protocol packet according to an embodiment of the invention.

6. DESCRIPTION OF THE EMBODIMENTS

Hereinafter in the description, embodiments of the invention are presented in a communication infrastructure. This infrastructure can be implemented to route communication data to fixed or mobile terminals and the invention can be intended to install virtualized functions used for the routing and/or the processing of residential or enterprise client data.

Reference is made first of all to [FIG. 2] which presents a simplified view of a communication between two nodes according to an aspect of the invention. As in [FIG. 1] for the nodes 400 and 410, a node 100, corresponding to a terminal device, transmits application data of the applications App1, App2 to a node 110, and transmits IP packets comprising the IP address (source) of the node 100, the IP address (destination) of the node 110, the port PS (source) of the transport SCTP protocol, the port (destination) of the transport SCTP protocol and application data relating to the applications App1 and App2. The nodes 100 and 110 can equally be terminals, servers, telephony and/or videotelephony communication equipment, routing and/or management entities of a communication network. The applications App1 and App2 can be applications allowing users of the nodes 100 and 110 to access value-added services, management applications of a communication network, or, equally, any application for which the data are transported over an Internet network. Only two applications App1 and App2 are represented in [FIG. 1] and [FIG. 2], but there are no intrinsic limits as to the number of applications that can benefit from the switching method. The SCTP protocol used for the transport of the data of the applications App1 and App2 comprises a header comprising the source port PS and the destination port P0. Unlike [FIG. 1] in which the destination ports (to recap, P1 and P2) distinguished the applications (respectively App1 and App2), the destination port P0 is common to both the applications App1 and App2 and does not therefore make it possible to differentiate the data of the applications App1 and App2. On reception of the SCTP packets, the node 110, corresponding to a multiplexing device comprising a switching device, cannot differentiate the data of the applications App1 and App2 by simply reading and interpreting the destination port of the header of the SCTP protocol. To ensure the switching of the data of the applications App1 and App2 to the entities or the software applications managing these two applications, another information item present in a data fragment (or data chunk) of the SCTP packet is used to complement the destination port P0. This information item is an identifier PPI1 (payload protocol identifier 1) present in each data fragment of the SCTP protocol. Thus, with the first identifier P0 of the header of the SCTP protocol and the second identifier PPI1 of a fragment of the SCTP protocol, the multiplexing device is capable of switching the data of the application App1, corresponding to the identifier P0-PPI1, to the entity responsible for the application App1. On reception of a packet comprising the two identifiers P0 and PPI1, the node 110, capable of analyzing the SCTP packets, verifies that these identifiers correspond to applications for which it can switch the data and, if such is the case, it transmits the data to the application App1. The application App1 corresponds here to a physical or software entity capable of managing the data of the application App1. In the case where the data of the application App1 relate to a voice-over-IP service, the data of the application will be able to be transferred to a software entity present on the node 110 or else to another physical entity possibly by using a communication protocol between the node 110 and this other physical entity that is different from the SCTP protocol. Likewise, when the node 110 receives an SCTP packet comprising a header containing a destination port P0 and a fragment comprising an identifier PPI2, if the application App2 corresponding to the identifiers P0 and PPI2 forms part of the applications multiplexed by the node 110, then it transmits the data of the application App2 to the entity responsible for the application App2. The implementation of the invention presented in [FIG. 2] is symmetrical and the nodes 100 and 110 can be switched, the node 100 being able to correspond to the multiplexing device and the node 110 to a terminal device. The two nodes 100 and 110 can thus comprise multiplexing devices, each node 100 and 110 being able to comprise a configuration device and a multiplexing device. In a bidirectional communication, one of the two nodes acts as the multiplexing device and the other node acts as the configuration device. It should be noted that, in the context of a bidirectional communication, the application data transmitted by the node 110 or via the node 110 to the node 100 are transmitted in SCTP packets in accordance with the specifications of the protocol, notably by using the source IP address, destination IP address, source port and destination port information items.

According to one example, in the case where the identifiers received by the node 110 correspond to an application for which the node 110 does not perform the switching of the data, or else it is not possible to identify an application from these identifiers, then an error message is transmitted to the node 100.

According to another example, if an error message is transmitted, this message can advantageously be an SCTP packet comprising an Abort error code. According to one alternative, the error message can further comprise a failure code allowing the node 100 to identify the cause, whether it be that it is a bad formation of the SCTP packet transmitted to the node 110 or else that the node 110 has not been correctly selected or even that the identifiers have not been correctly positioned.

According to one example, the first destination port identifier positioned in the header of the SCTP protocol is a port dedicated to the multiplexing method facilitating the processing to be performed on the packet received for the node 110. According to one alternative, the dedicated port used as first identifier can be the port number 1 used in particular by the TCPMux protocol, specified in the IETF document RFC 1078, thus making it possible to identify a common multiplexing port for a wide range of transport protocols. According to one alternative, the first destination port identifier corresponds to a port already used for an application relying on SCTP, for example assigned by the IANA, thus avoiding making use of a new destination port number.

Reference is now made to [FIG. 3] which presents a simplified view of a communication between two nodes according to another aspect of the invention.

As in [FIG. 1] and [FIG. 2] for the respective nodes 400, 410, 100, 110, a node 300, corresponding to a terminal device, transmits application data of the applications App1, App2 to a node 310, corresponding to an agent device, and transmits IP packets comprising the IP address (source) of the node 300, the IP address (destination) of the node 310, the port PS (source) of the transport SCTP protocol, the port (destination) of the transport SCTP protocol and application data relating to the applications App1 and App2.

According to this aspect of the invention, an application AppM relating to the SCTP protocol, called a generic application, is also deployed on the node 310. The applications App1 and App2 can, according to one example, be implemented in equipment distinct from the node 310.

The SCTP protocol used for the transport of the data of the applications App1 and App2 comprises a header comprising the source port PS and the destination port PM. Unlike [FIG. 1] in which the destination ports (to recap, P1 and P2) distinguished the applications (respectively App1 and App2), and [FIG. 2] in which the destination port P0, although common to both the applications App1 and App2, did not specifically identify an application, the destination port PM of the SCTP protocol unambiguously identifies the generic application AppM. Thus, all the SCTP association packets comprising the destination port PM are routed to the application AppM. The port PM is indeed specific to the generic application, but since only a single port is requested addressing the issue of port availability. Independently of the application App1 and App2 that are the recipients of the packets transmitted to the node 310, the latter are routed to the application AppM and does not therefore make it possible to differentiate the data of the applications App1 and App2. The node 310, via the application AppM, comprises a mediation device for the data streams intended for the user applications App1 and App2. In fact, the node 310, on reception of the SCTP request packets makes use of an identification datum, respectively RPPI1 (required payload protocol identifier 1) and RPPI2 corresponding to identifiers of applications App1 and App2 requested by the node 100. These identifiers transmitted in a single request message or in two distinct request messages are present in the fragments of the SCTP protocol, to verify that the applications App1 and App2 do indeed form part of the applications for which the agent node 310 ensures the mediation. If such is the case, the node 310 transmits an agreement message, for example by using the SCTP protocol, to the node 300 informing it that that an SCTP connection for the application App1 can be operated between the node 300 and the node 310, this connection being operated via the generic application AppM. This aspect of the invention therefore makes it possible, like the first aspect of the invention, to be able to multiplex application streams relating to a plurality of applications, while preserving the destination ports used for the routing of the SCTP packets.

According to an alternative, the node 310 can further use the destination port identifier PM in addition to the requested user application identifiers (here RPPI1 and RPPI2) to verify that the user applications App1 and App2 determined from these identifiers form part of the applications for which the agent node 310 ensures the mediation.

According to one example, the agreement message comprises an identifier PPI1 (respectively PPI2) corresponding to the application for which the success message is transmitted to the node 100 and which will be able to be used to mark the fragment comprising the data of the application App1 (respectively App2) transmitted to the node 310 upon the sending of these data to the node 310.

According to one example, the node 300 then transmits, to the node 310, an SCTP packet comprising the header containing the destination port PM and an identifier PPI1 (respectively PPI2) corresponding to the application App1 (respectively App2) obtained in the response message received or else memorized in the node 300. On reception, in accordance with the success message transmitted, the node 310 transmits the application data relating to the application App1 (respectively App2) to the application App1 (respectively App2) or to the entity responsible for the reception and processing of these application data present in the SCTP fragments.

According to one example, in the case where the application App1 does not form part of the applications for which the node 310 ensures the mediation, a failure message is transmitted to the node 300 thus indicating to it that the node 310 is not able to receive, and if appropriate transfer to a distinct entity, the data relating to the application App1 for which the node 310 has been invoked via the association packet received.

According to another example, the success message comprises all of the identifiers, for example PPI1 and PPI2, of the applications for which the node 310 ensures the mediation independently of the identifiers of the user applications requested by the node 300.

As for the nodes of [FIG. 2], the nodes 300 and 310 can comprise the two devices, namely the terminal device and the mediation device, and use them according to the node which initiates the SCTP connection.

In relation to [FIG. 4], an outline is presented of the method for switching a datum relating to an application and of the configuration method according to a first embodiment of the invention. In this [FIG. 4], two nodes 100 and 110 communicate for example via a communication network, such as the Internet network, a mobile infrastructure, an enterprise network or any type of infrastructure allowing the node 100 and the node 110 to exchange SCTP packets.

In a step 200, the node 100, comprising a configuration device, transmits an SCTP INIT message to the node 110. This SCTP message more specifically comprises an INIT control fragment to establish an association with the node 110.

In response to the SCTP INIT message received from the node 100, the node 110 transmits, in the step 210, to the node 100, an SCTP INIT ACK message to the node 100 in the step 210. This message notably comprises an INIT ACK control fragment and a cookie state information item.

In response to the SCTP INIT ACK message received, the node 100 transmits, to the node 110, an SCTP COOKIE-ECHO response message in the step 220. This message makes it possible to finalize the SCTP association between the nodes 100 and 110, initialized by the node 100. The message comprises a fragment containing the value of the cookie state received in the SCTP INIT ACK message.

In response to the COOKIE-ECHO message received, the node 110 transmits, in the step 230, an SCTP COOKIE-ACK message after having verified the authenticity of the value of the cookie state received. This COOKIE-ACK message acknowledges the COOKIE-ECHO message and the SCTP session is effectively established between the node 100 and the node 110 once this message has been received by the node 100.

Once the SCTP session is established, the node 100 transmits application data relating to an application App1 to the node 110 in a step 240. More specifically, the SCTP message transmitted by the node 100 comprises a header in which the destination port is a port not specific to an application but a port common to a set of applications. The SCTP message further comprises at least one fragment comprising an identifier of the application App1, such as a character string identifying the application App1, and application data intended for a process or an entity responsible for receiving, processing and transmitting data of the application App1. The node 100, from a configuration device, in a step 235, parameterizes the SCTP packet comprising the header and the at least one fragment, and transmits, in the step 240, the parameterized packet to the node 110, this node 110 comprising a switching device.

On reception of the SCTP message, the node 110 comprising the switching device verifies, in a step 245, that the destination port identifier and the application identifier received in the SCTP packet correspond to an application for which the switching device routes the application data, and if such is the case, the switching device transmits the application data of the application App1 to the entities responsible for the application App1. In the unfavorable case in which the identifiers of the header and of the fragment do not make it possible to identify an application or if the identified application does not form part of the applications for which the data are switched by the node 110, the node 110 transmits an error message, for example an SCTP message comprising an ABORT fragment to the node 100 in a step 250.

Reference is now made to [FIG. 5] which presents an outline of the method for mediating a plurality of applications via a generic application and the parameterizing method according to an embodiment of the invention.

The first four steps 500, 510, 520, 530 are equivalent to the respective steps 200, 210, 220, 230, except that the destination port of the header of the messages 300 and 320 is a source port corresponding to a generic SCTP mediation application. At the end of the reception of the COOKIE-ACK message in the step 330, the nodes 300 and 310 have established an SCTP session relying on a generic mediation application.

In a step 535, the node 300 parameterizes an SCTP packet with a header comprising the destination port corresponding to a generic mediation application and with a data fragment comprising application identifiers requested by the device 300. The requested identifiers correspond to identifiers for which the node 300 wants to know if the generic application ensures the mediation for the application data of the applications corresponding to these identifiers. In a step 540, the node 300 transmits, to the node 310, an SCTP request message in which the header contains the destination port parameterized with an identifier of the generic application, and at least one fragment comprising one or more identifiers of user applications requested by the node 300. The node 300, by this message, indicates to the node 310 that it wants to know if the node 310 accepts receiving data and transmitting them to software entities present on the node 310 or to nodes distinct from the node 310 for one or more user applications for which the identifier or the identifiers are located in the fragment of the SCTP request packet. The node 300 can choose to transmit a request message for each user application or else transmit a request message for a set of user applications.

On reception of the request message, the node 310 examines, in a step 545, if it ensures the mediation for the identifier or the identifiers received and transmits, to the node 300 in a step 550, in response to the request message, an agreement message indicating to the node 300 that it is able to receive SCTP messages for the user application or the user applications for which the identifier or the identifiers have been received. In this favorable case, the node 300 can transmit, in a step 560, SCTP packets comprising a user datum specific to the application or to one of the applications for which the node 300 has transmitted a success message.

In the case where only a part of the user applications corresponding to the received identifiers are effectively managed by the node 310, the node 310 can transmit, in the step 550, the list of the identifiers corresponding to the applications for which it ensures the mediation via the generic application. According to another example, the node 310 can also inform the node 300 of the applications for which it ensures the mediation by transmitting their identifiers, independently of the identifier or the identifiers received from the node 300. According to yet another example, the node 310 can transmit a failure message, for example comprising an ABORT fragment, if none of the received identifiers corresponds to an application for which it ensures the mediation, possibly thus terminating the SCTP session between the node 300 and the node 310.

It should be noted that the embodiments are described using the SCTP protocol but these embodiments could also be proposed with a stream transport protocol having transport layer characteristics equivalent to the SCTP protocol.

In relation to [FIG. 6], a device for configuring a packet of a stream transport protocol is presented according to an embodiment of the invention.

Such a device 100, also called terminal device, can be implemented in a user equipment or else a gateway of a personal network. It can also be implemented in an application server, in a router of a communication network or of an intermediary equipment (DPI (deep packet inspection) or firewall) or even in a piece of equipment of a mobile network (access gateway, server of an MEC (mobile edge computing) architecture).

For example, the device 100 comprises a processing unit 1030, equipped for example with a microprocessor P, and driven by a computer program 1010, stored in a memory 1020 and implementing the determination method according to the invention. On initialization, the code instructions of the computer program 1010 are for example loaded into a RAM memory, before being executed by the processor of the processing unit 1030.

Such a device 100 comprises:
a parameterizing module 1001, capable of parameterizing the packet with a first destination port identifier in the header and with a second identifier specific to an application in the data fragment,
a transmitter 1002, capable of transmitting the parameterized packet to a multiplexing device.

In relation to [FIG. 7], a device for switching a datum relating to an application is presented according to an embodiment of the invention.

Such a device 110, also called multiplexing device, can be implemented in an application server, in a router of a communication network or an intermediary equipment (DPI (deep packet inspection) or firewall) or even in a piece of equipment of a mobile network (access gateway, server of an MEC (mobile edge computing) architecture). The device 100 can also be implemented in a user equipment.

For example, the device 110 comprises a processing unit 1130, equipped for example with a microprocessor P, and driven by a computer program 1110, stored in a memory 1120 and implementing the determination method according to the invention. On initialization, the code instructions of the computer program 1110 are for example loaded into a RAM memory, before being executed by the processor of the processing unit 1130.

Such a device 110 comprises:
- a receiver 1101, capable of receiving, from a terminal device, the packet Paq of the stream transport protocol comprising a header containing a first destination port identifier common to the plurality of applications, and the data fragment comprising a second identifier specific to the application,
- a determination module 1103, capable of determining the application according to the first and second identifiers received,
- a transmitter 1102, capable of transmitting the datum Don to an entity responsible for the processing of the datum of the application in the case where the application is determined.

In relation to [FIG. 8], a device for parameterizing a stream control transport protocol packet is presented according to an embodiment of the invention.

Such a device 300, also called terminal device, can be implemented in a user equipment or else a gateway of a personal network. It can also be implemented in an application server, in a router of a communication network or an intermediate equipment (DPI (deep packet inspection) or firewall) or even in a piece of equipment of a mobile network (access gateway, server of an MEC (mobile edge computing) architecture).

For example, the device 300 comprises a processing unit 3030, equipped for example with a microprocessor µP, and driven by a computer program 3010, stored in a memory 3020 and implementing the determination method according to the invention. On initialization, the code instructions of the computer program 3010 are for example loaded into a RAM memory, before being executed by the processor of the processing unit 3030.

Such a device 300 comprises:
- a determination module 3001, capable of determining a request packet Req of the stream control transport protocol, comprising a data fragment comprising an identification datum of a user application requested by the terminal device,
- a transmitter 3002, capable of transmitting, to the agent device, the determined request packet.

In relation to [FIG. 9], a device for mediating a plurality of applications via a generic application is presented according to an embodiment of the invention.

Such a device 310, also called agent device, can be implemented in an application server, in a router of a communication network or an intermediary equipment (DPI (deep packet inspection) or firewall) or even in a piece of equipment of a mobile network (access gateway, server of an MEC (mobile edge computing) architecture). The device 100 can also be implemented in a user equipment.

For example, the device 310 comprises a processing unit 3130, equipped for example with a microprocessor µP, and driven by a computer program 3110, stored in a memory 3120 and implementing the determination method according to the invention. On initialization, the code instructions of the computer program 3110 are for example loaded into a RAM memory, before being executed by the processor of the processing unit 3130.

Such a device 310 comprises:
- a receiver 3101, capable of receiving, from the terminal device, a request packet Req of the stream control transport protocol comprising a data fragment containing an identifier of a user application requested by the terminal device,
- a verification module 3102 capable of verifying that the requested user application is an application of the plurality,
- a transmitter 3103, capable of transmitting, to the terminal device, an agreement message Acc in the case where the requested user application is an application of the plurality.

Although the present disclosure has been described with reference to one or more examples, workers skilled in the art will recognize that changes may be made in form and detail without departing from the scope of the disclosure and/or the appended claims.

The invention claimed is:

1. A mediation method comprising:
   mediating a plurality of user applications via an application relating to a Stream Control Transport Protocol, called a generic application, the mediating being implemented in an agent device, capable of establishing a connection based on the Stream Control Transport Protocol with a terminal device, and comprising:
   receiving from the terminal device a request packet of the Stream Control Transport Protocol comprising a data fragment containing an identifier of a user application requested by the terminal device and further comprising a header containing a destination port identifier dedicated to the generic application;
   verifying that the requested user application is an application of the plurality; and
   in the case where the requested user application is an application of the plurality, transmitting to the terminal device an agreement message.

2. The mediation method as claimed in claim 1, in which the agreement message comprises at least one identifier of a user application of the plurality accessible from the generic application.

3. The mediation method as claimed in claim 1, further comprising:
   receiving, from the terminal device, an application packet of the Stream Control Transport Protocol comprising a data fragment containing the identifier specific to the requested user application and an application datum specific to the requested user application; and
   transmitting, to the requested user application, the application datum received.

4. The mediation method as claimed in claim 1, further comprising transmitting, to the terminal device, a failure message in the case where the identifier of the requested user application does not correspond to a user application of the plurality.

5. The mediation method as claimed in claim 4, in which the failure message is a packet of the Stream Control Transport Protocol, comprising a fragment of Abort type terminating an association established between the terminal device and the agent device.

6. The mediation method as claimed in claim 1, in which the failure message further comprises a cause of failure intended for an entity of the terminal device requesting the application.

7. A parameterizing method for parameterizing a request packet of a Stream Control Transport Protocol, transmitted to an agent device, the method being implemented by a terminal device capable of communicating with the agent device, and comprising:
    determining a request packet of the Stream Control Transport Protocol, comprising a data fragment comprising an identification datum of a user application requested by the terminal device and further comprising a header containing a destination port identifier dedicated to an application relating to the Stream Control Transport Protocol and mediating a plurality of user applications, called a generic application; and
    transmitting, to the agent device, the determined request packet.

8. The parameterizing method as claimed in claim 7, further comprising transmitting, to the agent device, an application packet of the Stream Control Transport Protocol comprising a data fragment containing an identifier specific to the requested application and an application datum specific to the requested application.

9. A device comprising:
    a receiver, capable of receiving, from a terminal device, a request packet of a Stream Control Transport Protocol comprising a data fragment containing an identifier of a user application requested by the terminal device and further comprising a header containing a destination port identifier dedicated to a generic application relating to the Stream Control Transport Protocol and mediating a plurality of user applications, the generic application being capable of establishing a connection based on the Stream Control Transport Protocol with the terminal device;
    at least one processing unit, which is configured to verify that the requested user application is an application of the plurality; and
    a transmitter, capable of transmitting, to the terminal device, an agreement message in the case where the requested user application is an application of the plurality.

10. A device for parameterizing a request packet of a Stream Control Transport Protocol, transmitted to an agent device, implemented in a terminal device and comprising:
    at least one processing unit, which is configured to determine a request packet of the Stream Control Transport Protocol, comprising a data fragment comprising an identification datum of a user application requested by the terminal device, and further comprising a header containing a destination port identifier dedicated to a generic application mediating a plurality of user applications; and
    a transmitter, capable of transmitting, to the agent device, the determined request packet.

11. A non-transitory computer readable medium comprising instructions stored thereon for implementing a mediation method when the instructions are executed by a processor of an agent device, wherein the mediation method comprises:
    receiving from a terminal device a request packet of a Stream Control Transport Protocol comprising a data fragment containing an identifier of a user application requested by the terminal device and further comprising a header containing a destination port identifier dedicated to a generic application relating to the Stream Control Transport Protocol and mediating a plurality of user applications, the generic application being capable of establishing a connection based on the Stream Control Transport Protocol with the terminal device;
    verifying that the requested user application is an application of the plurality; and
    in the case where the requested user application is an application of the plurality, transmitting to the terminal device an agreement message.

12. A non-transitory computer readable medium comprising instructions stored thereon for implementing a parameterizing method when the instructions are executed by a processor of a terminal device, wherein the parameterizing method parameterizes a request packet of a Stream Control Transport Protocol, transmitted to an agent device, the terminal device is capable of communicating with the agent device, and the parameterizing method comprises:
    determining a request packet of the Stream Control Transport Protocol, comprising a data fragment comprising an identification datum of a user application requested by the terminal device and further comprising a header containing a destination port identifier dedicated to an application relating to the Stream Control Transport Protocol and mediating a plurality of user applications, called a generic application; and
    transmitting, to the agent device, the determined request packet.

* * * * *